US012383912B2

(12) United States Patent
Sekino et al.

(10) Patent No.: US 12,383,912 B2
(45) Date of Patent: Aug. 12, 2025

(54) LIQUID JETTING NOZZLE AND LIQUID JETTING DEVICE

(71) Applicant: SEIKO EPSON CORPORATION, Tokyo (JP)

(72) Inventors: Hirokazu Sekino, Chino (JP); Yasunori Onishi, Shiojiri (JP); Takeshi Seto, Chofu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 572 days.

(21) Appl. No.: 17/652,196

(22) Filed: Feb. 23, 2022

(65) Prior Publication Data

US 2022/0266268 A1 Aug. 25, 2022

(30) Foreign Application Priority Data

Feb. 24, 2021 (JP) ................................. 2021-027381

(51) Int. Cl.
*B05B 1/08* (2006.01)

(52) U.S. Cl.
CPC ..................................... *B05B 1/08* (2013.01)

(58) Field of Classification Search
CPC .. B05B 1/02; B05B 1/08; B05B 1/083; B05B 1/205; B05B 12/082; B05B 5/165
USPC ............................................... 239/589, 589.1
See application file for complete search history.

(56) References Cited

U.S. PATENT DOCUMENTS 4,793,556 A * 12/1988 Sharp ........................ B05B 7/00 261/78.2
4,890,792 A 1/1990 Martin et al.
4,925,106 A 5/1990 Maas et al.
5,184,776 A * 2/1993 Minier ...................... B05B 1/02 239/417
2004/0222317 A1* 11/2004 Huffman ............... B05B 7/0475 239/398
2007/0063066 A1 3/2007 Vijay et al.
2009/0308948 A1 12/2009 Vijay et al.
2010/0243753 A1* 9/2010 Doak .................... B05B 7/0475 239/398
2011/0089251 A1 4/2011 Vijay et al.
2011/0186655 A1 8/2011 Ghavami-Nasr et al.
(Continued)

FOREIGN PATENT DOCUMENTS

CN 102781791 A 11/2012
JP H04500038 A 1/1992
(Continued)

OTHER PUBLICATIONS

Simulation of Vacuum Jet Atomization with Plain-Orifice Nozzle.
Office Action for JP Patent Application No. JP2021027381, issued on Jul. 31, 2024, 8 pages.

*Primary Examiner* — Arthur O. Hall
*Assistant Examiner* — Juan C Barrera
(74) *Attorney, Agent, or Firm* — CHIP LAW GROUP

(57) ABSTRACT

Provided is a liquid jetting nozzle including a nozzle hole, the liquid jetting nozzle be configured to hit liquid droplets against a target object, the liquid droplets being generated from a continuous flow of a liquid jetted from the nozzle hole, wherein a nozzle hole diameter of the nozzle hole is in a range of from 0.01 mm to 0.15 mm, and a ratio of an opening diameter of a liquid inlet through which a liquid flows into the nozzle hole to a nozzle hole diameter is in a range of from 5 to 150.

11 Claims, 7 Drawing Sheets

(56) References Cited

U.S. PATENT DOCUMENTS

| | | | | |
|---|---|---|---|---|
| 2011/0248099 | A1 | 10/2011 | Ghavami-Nasr et al. | |
| 2012/0061485 | A1 | 3/2012 | Vijay et al. | |
| 2016/0074899 | A1* | 3/2016 | Carbajal | B05C 5/0225 239/583 |
| 2016/0152405 | A1 | 6/2016 | Ghavami-Nasr et al. | |
| 2017/0203322 | A1* | 7/2017 | Ivri | B01J 19/0046 |
| 2018/0134482 | A1 | 5/2018 | Ghavami-Nasr et al. | |

FOREIGN PATENT DOCUMENTS

| | | | |
|---|---|---|---|
| JP | 2001241887 | A | 9/2001 |
| JP | 2010129840 | A | 6/2010 |
| JP | 2021023997 | A | 2/2021 |

* cited by examiner

LIQUID JETTING NOZZLE AND LIQUID JETTING DEVICE

The present application is based on, and claims priority from JP Application Serial Number 2021-027381, filed Feb. 24, 2021, the disclosure of which is hereby incorporated by reference herein in its entirety.

BACKGROUND

1. Technical Field

The present disclosure relates to a liquid jetting nozzle and a liquid jetting device that jets a liquid at a high pressure toward a target object so as to perform predetermined processing.

2. Related Art

Conventionally, there has been known an ultrasonic water jetting device that performs processing such as cutting or washing of a target object by forming a continuous flow of high-pressure water into liquid droplets using a piezoelectric element and by causing the liquid droplets to impinge on the target object (JP-T-2007-523751).

Further, there has been also known a foaming nozzle structure configured to jet an atomized liquid by forming a foam in a continuous flow (JP-T-4-500038). The foaming nozzle structure is formed in a circular shape, as a whole, where rounded rear edges of respective ribs have a radius of R. In the document, there is a description that assuming a width of a slot having the radius R as S, a ratio between the width S and the radius R of the slot is expressed by R:S=1:2 to 1:4.

However, neither one of the above-mentioned documents takes into account a technique that causes liquid droplets produced by splitting a continuous flow of liquid jetted from a jetting port of a nozzle hole to fly over a long distance of 100 mm to 150 mm from the jetting port with high straight advancing property.

Further, in the foaming nozzle structure of JP-T-4-500038, atomized liquid is deflected in various directions so that jetting of the liquid in an atomized form can be performed with certainty. However, the liquid droplets cannot be jetted linearly and hence, there exists a drawback that it is difficult to realize a uniform cleaning force and cleaning of a part of a target object.

SUMMARY

According to an aspect of the present disclosure, there is provided a liquid jetting nozzle that includes a nozzle hole, and is configured to hit liquid droplets against a target object, the liquid droplets being generated from a continuous flow of liquid jetted from the nozzle hole, wherein a nozzle hole diameter d of the nozzle hole is in a range of from 0.01 mm to 0.15 mm, and a ratio D/d that is a ratio of an opening diameter D of a liquid inlet that forms an inlet through which the liquid flows into the nozzle hole to the nozzle hole diameter d is in a range of from 5 to 150.

Further, according to another aspect of the present disclosure, there is provided a liquid jetting device including a liquid jetting nozzle configured to hit liquid droplets against a target object, the liquid droplets being generated from a continuous flow of liquid jetted from the nozzle hole, wherein the liquid jetting device further includes a pressurized liquid supply unit configured to pressurize and supply a liquid to the liquid jetting nozzle, and the liquid jetting nozzle is configured such that a nozzle hole diameter d of the nozzle hole is in a range of from 0.01 mm to 0.15 mm, and a ratio D/d that is a ratio of an opening diameter D of a liquid inlet that forms an inlet through which the liquid flows into the nozzle hole to a nozzle hole diameter d is in a range of from 5 to 150.

DESCRIPTION OF EXEMPLARY EMBODIMENTS

Figure 1:
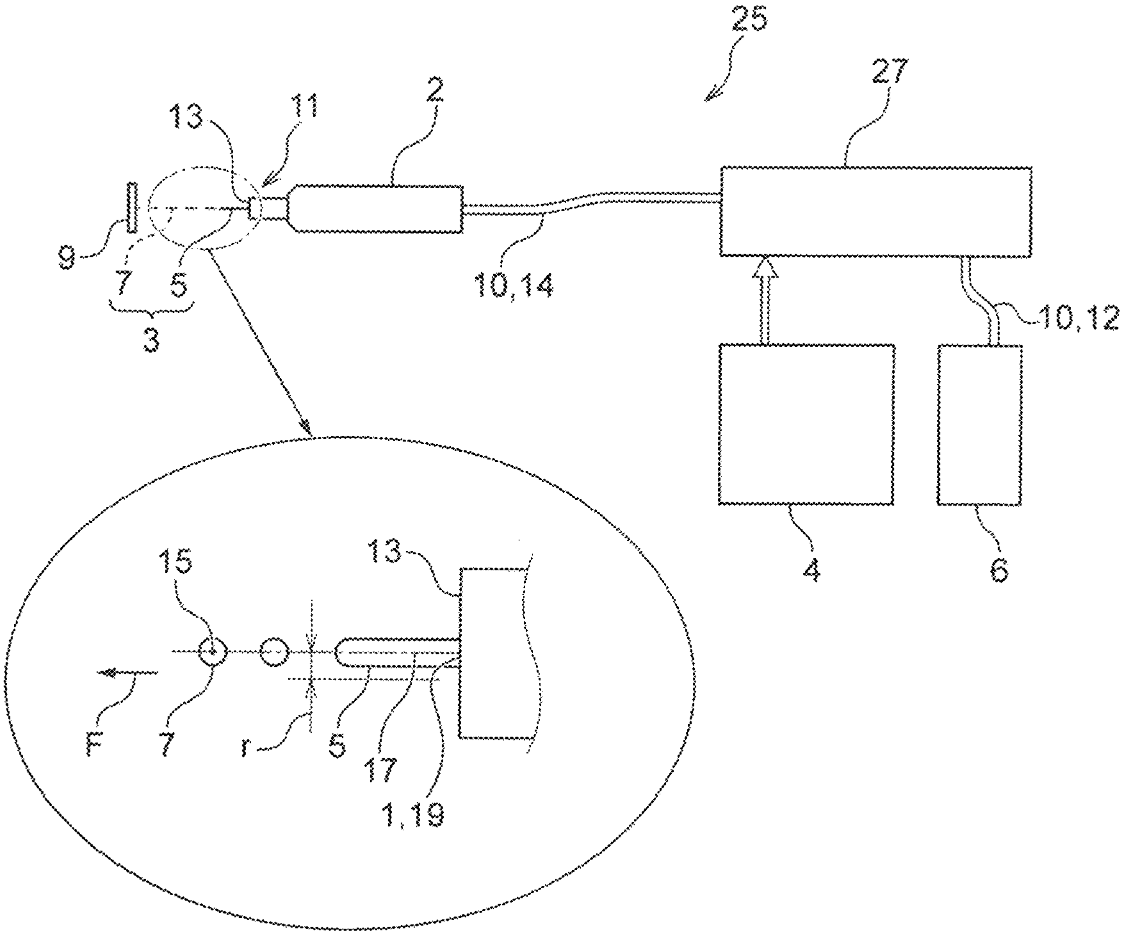
FIG. 1 is view illustrating an overall schematic configuration of a liquid jetting device including a liquid jetting nozzle of a first embodiment according to the present disclosure.

First, the present disclosure is schematically described hereinafter.

According to a first aspect of the present disclosure, there is provided a liquid jetting nozzle including a nozzle hole and being configured to hit liquid droplets against a target object, the liquid droplets being generated from a continuous flow of liquid jetted from the nozzle hole, wherein a nozzle hole diameter d of the nozzle hole is in a range of from 0.01 mm to 0.15 mm, and a ratio D/d that is a ratio of an opening diameter D of a liquid inlet that forms an inlet through which the liquid flows into the nozzle hole to the nozzle hole diameter d is in a range of from 5 to 150.

According to the present aspect, the nozzle hole diameter d of the nozzle hole is in a range of from 0.01 mm to 0.15 mm, and the ratio D/d of the opening diameter D of the liquid inlet which forms the inlet through which the liquid flows into the nozzle hole to the nozzle hole diameter d is in a range of from 5 to 150. Accordingly, it is possible to cause the liquid droplets to fly with high straight advancing property thus causing the liquid droplets to fly over a long distance of 100 mm to 150 mm from an end surface on a discharge side of the nozzle hole with high straight advancing property.

A liquid jetting nozzle according to a second aspect of the present disclosure is characterized in that, in the first aspect, a ratio L/d of a length L of a straight portion in a liquid jetting direction of the nozzle hole to the nozzle hole diameter d is in a range of from 0.5 to 5.

According to the present aspect, the ratio L/d of the length L of the straight portion in the liquid jetting direction of the nozzle hole to the nozzle hole diameter d is in the range of from 0.5 to 5. With such a configuration, advantageous effects of the first aspect can be realized with greater accuracy.

According to a third aspect of the present disclosure, there is provided a liquid jetting nozzle including a nozzle hole, the liquid jetting nozzle being configured to hit liquid droplets against a target object, the liquid droplets being generated from a continuous flow of liquid jetted from the nozzle hole, wherein a flying trajectory of a center of the liquid droplet is within a radius of 0.5 mm from a center axis of the nozzle hole, along a predetermined distance from an end surface of the nozzle hole on a discharge side.

According to the present aspect, by causing the liquid droplets fly linearly while suppressing the deviation of the liquid droplets, it is possible to cause the liquid droplets to impinge on the same place on the target object repeatedly and hence, cleaning of a part of the target object can be realized.

According to a fourth aspect of the present disclosure, there is provided a liquid jetting device including a liquid jetting nozzle configured to hit liquid droplets against a target object, the liquid droplets being generated from a continuous flow of liquid jetted from the nozzle hole, the liquid jetting device further including a pressurized liquid supply unit configured to pressurize and supply a liquid to the liquid jetting nozzle, wherein the liquid jetting nozzle is the liquid jetting nozzle according to any one of the first to third aspects.

According to the present aspect, the liquid jetting device can acquire advantageous effects substantially equal to the advantageous effects of any one of the above-mentioned first to third aspects can be obtained.

A liquid jetting device according to a fifth aspect of the present disclosure is characterized in that, in the fourth aspect, the pressurized liquid supply unit is configured to supply the liquid at a supply pressure such that an injection pressure of a liquid injected from the injection nozzle hole is in a range of from 0.2 MPa to 10 MPa.

According to the present aspect, the pressurized liquid supply unit is configured to supply the liquid at a supply pressure at which the jetted pressure of the liquid jetted from the nozzle hole is in a range of from 0.2 MPa to 10 MPa. With such a configuration, the advantageous effects substantially equal to the advantageous effect of any one of the first to third aspects can be obtained with greater accuracy.

First Embodiment

A liquid jetting device provided with a liquid jetting nozzle of the first embodiment according to the present disclosure is described in detail with reference to FIG. 1 to FIG. 6. This liquid jetting device is a device (for example, a device for cleaning precision machine parts) where liquid droplets are required to fly with high straight advancing property over a long distance of 100 mm to 150 mm from an end surface of a nozzle hole on a discharge side.

Here, it is needless to say that the liquid jetting device is not limited to the device described above, and the liquid jetting device is also applicable to cleaning of a skin of a face or the like.

As illustrated in FIG. 1, a liquid jetting device 25 according to the present embodiment includes: a jetting unit 2 including a liquid jetting nozzle 11 configured to jet a liquid 3, a liquid tank 6 configured to store the liquid 3 to be jetted, a pump unit 27 that forms a pressurized liquid supply unit, a liquid suction tube 12 that forms a flow path 10 for the liquid 3 that couples the liquid tank 6 and the pump unit 27 to each other, and a liquid feed tube 14 that also forms the flow path 10 that couples the pump unit 27 and the jetting unit 2 to each other.

In the pump unit 27, a pump operation is controlled by the control unit 4. That is, the control unit 4 adjusts a pressure of the liquid 3 fed to the jetting unit 2 through the liquid feed tube 14, or the like.

Liquid Jetting Nozzle

The liquid jetting nozzle 11 has one or a plurality of nozzle holes 1, and the high-pressure liquid 3 is jetted from the nozzle holes 1. The hole shape of the nozzle hole 1 is a circular shape. In a view that partially enlarges a part of the view in FIG. 1, symbol F indicates a liquid jetting direction. In the view which partially enlarges a part of the view in FIG. 1, in order to facilitate the understanding of the drawing, the size of the liquid droplets 5 and the size of the continuous flow 7 are greatly enlarged compared to other members, and actual relative size relationships are ignored.

The high pressure liquid 3 jetted from the nozzle hole 1 is a continuous flow 5 immediately after being jetted and, thereafter, is split into a group of liquid droplets 7 by being immediately formed into liquid droplets by a surface tension of the liquid 3. A predetermined processing is performed by causing the group of the liquid droplets 7 to impinge on the target object 9 one after another.

The liquid jetting nozzle 11 includes a liquid droplet straight advancing maintaining structure 19 that causes the liquid droplets 7 to fly with favorable straight advancing property in the liquid jetting direction F from the end surface 13 on the discharge side of the nozzle hole 1 over a long distance such as 100 mm to 150 mm.

Figure 2:
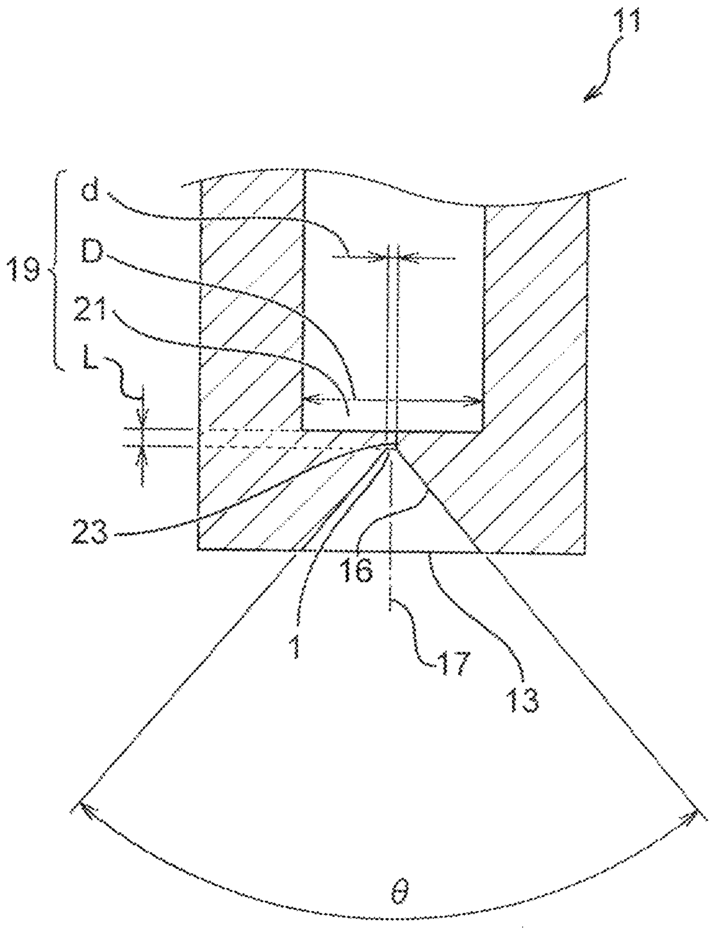
FIG. 2 is an enlarged cross-sectional view of a main portion of the liquid jetting nozzle of the first embodiment.

As illustrated in FIG. 2, in the present embodiment, the liquid droplet straight advancing maintaining structure 19 is configured such that a nozzle hole diameter d of the nozzle hole 1 is in a range of from 0.01 mm to 0.15 mm, and a ratio D/d of an opening diameter D of a liquid inlet 21 through which the liquid 3 flows into the nozzle hole 1 to the nozzle hole diameter d is in a range of from 5 to 150. FIG. 2 illustrates the structure where the number of the nozzle holes 1 is one.

The shape of an opening of the liquid inlet 21 is formed into a circular shape in a case where the number of nozzle hole 1 is one, and is formed in an elongated circular shape in a case where the number of nozzle holes 1 is plural. The shape of the opening of the liquid inlet 21 is not limited to the circular shape and the elongated circular shape, and may be a square shape, a rectangular shape, or the like. In the case where the shape of the opening of the liquid inlet 21 is a shape other than the circular shape, the opening diameter D of the liquid inlet 21 is determined by a size of one side of the square shape or a size of a short side of the rectangular shape.

The realization of the above-mentioned straight advancing property by setting the ratio D/d which is the ratio of the opening diameter D of the liquid inlet 21 to the nozzle hole diameter d within a range of 5 to 150 is confirmed by an actual measurement as described later.

Jetting Pressure

Further, in the liquid jetting device 25 according to the present embodiment, the pump unit 27, that is a pressurized liquid supply unit, is configured to supply the liquid 3 at a supply pressure such that a jetting pressure of the liquid 3 jetted from the nozzle hole 1 is in a range of from 0.2 MPa to 10 MPa.

It is also confirmed by an actual measurement that the straight advancing property can be realized by setting the jetted pressure within a range of from 0.2 MPa to 10 MPa, as described later.

The liquid jetting nozzle 11 having the structure illustrated in FIG. 2 has the structure where the jetted liquid 3 can easily form a contracted flow which is minimally brought into contact with a hole wall surface (straight portion 23) of the nozzle hole 1. By jetting the liquid 3 in a contracted flow state, the liquid 3 is minimally affected by surface roughness of the hole wall surface and hence, liquid droplets 7 having a uniform size can be easily formed.

Further, the liquid jetting nozzle 11 having the structure illustrated in FIG. 2 has a tapered portion 16 that expands in diameter toward the liquid jetting direction F on a liquid outflow side of the nozzle hole 1. The tapered portion 16 is formed so as to facilitate forming a fine nozzle hole having a nozzle hole diameter d of 0.01 mm to 0.15 mm without decreasing a mechanical strength of the nozzle hole. In the present embodiment, an angle of the tapered portion 16 is set to 90 degrees. However, the angle may be increased or decreased provided that the nozzle hole 1 is easily formed.

Hereinafter, the realization of the above-mentioned straight advancing property of the liquid droplets 7 by the liquid droplet straight advancing maintaining structure 19 according to the present embodiment is described by using actual measurement examples with respect to the specific structures.

Actual Measurement Example 1

Figure 3:
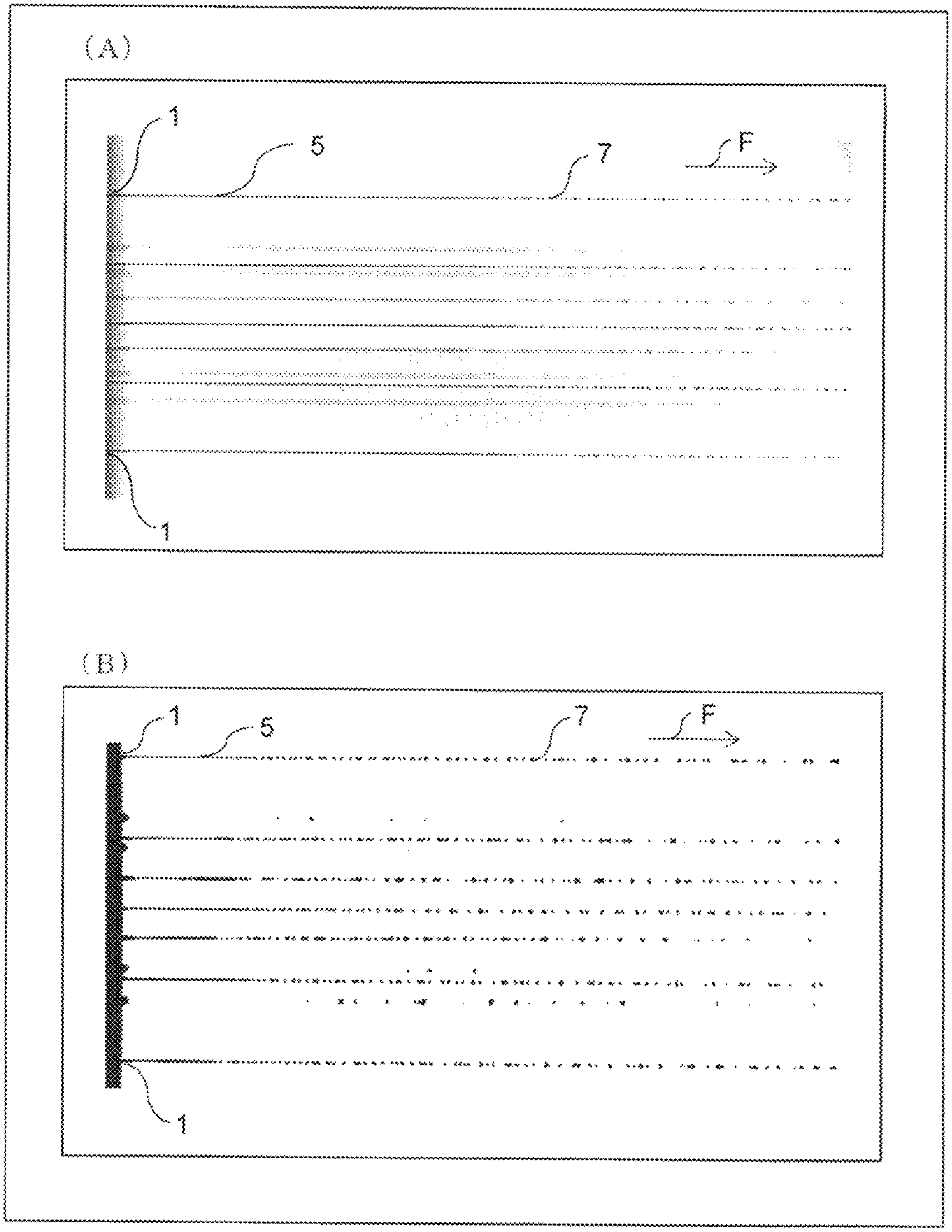
FIG. 3 is a high speed captured image diagram A and an analysis image diagram B of a flying trajectory of liquid droplets in a case where a ratio D/d is 125 in the first embodiment.

FIG. 3 illustrates the results of observing the flying trajectory of the liquid droplets 7 formed from the continuous flow 5 jetted in the liquid jet direction F from the nozzle hole 1 using a liquid jetting nozzle 11 where a nozzle diameter d of the nozzle hole 1 is 0 024 mm and an opening diameter D of the liquid inlet 21 is 3.0 mm, and a ratio D/d is 125. This observation was performed on liquid droplets 7 flying at a position 10 mm away from the end surface 13 on the discharge side of the nozzle hole 1. Using this result, a degree of the straight advancing property of the liquid droplets 7 was confirmed as described below. The supply pressure, that is the jetting pressure of the liquid 3 jetted from the nozzle hole 1, was set to 1.3 MPa. The liquid 3 was jetted from the nozzle hole 1 as a contracted flow.

FIG. 3A is a high speed captured image diagram obtained by capturing a flying trajectory of liquid droplets 7 using a high speed camera. FIG. 3B is a view of an analyzed image obtained by applying image processing to the captured image in FIG. 3A. A free software (ImageJ) was used for image processing. In the image processing, the captured image was binarized, a range where the continuous flow is formed into liquid droplets was selected as an analysis region, coordinates of the centers 15 of the respective liquid droplets 7 were analyzed, the maximum and minimum differentials of the coordinates in a direction orthogonal to the liquid jetting direction F that is a flying direction were obtained. Then, the obtained differential was set as a deviation amount from the center axis 17, that is, a radius r from the center axis 17 of the nozzle hole 1.

A deviation amount of the center 15 of the liquid droplet 7 with respect to the center axis 17 of the nozzle hole 1, that is, the radius r had a maximum amount of 0.2 mm. Accordingly, it was confirmed that the straight advancing property of the liquid droplet 7 was preferable. Further, it was confirmed that when the liquid droplet 7 is landed on the target object 9 at the position located 150 mm from the end surface 13 of the nozzle hole 1 on the discharge side, the landing range of the liquid droplet 7 was narrow that is, less than 0.3 mm in diameter from the center axis 27, or less than 0.1 $mm^2$ in area from the center axis 27. As a result of such an actual measurement example, it is safe to say that the liquid jetting nozzle 11 is effective in cleaning a part of a target object.

Actual Measurement Example 2

Figure 4:
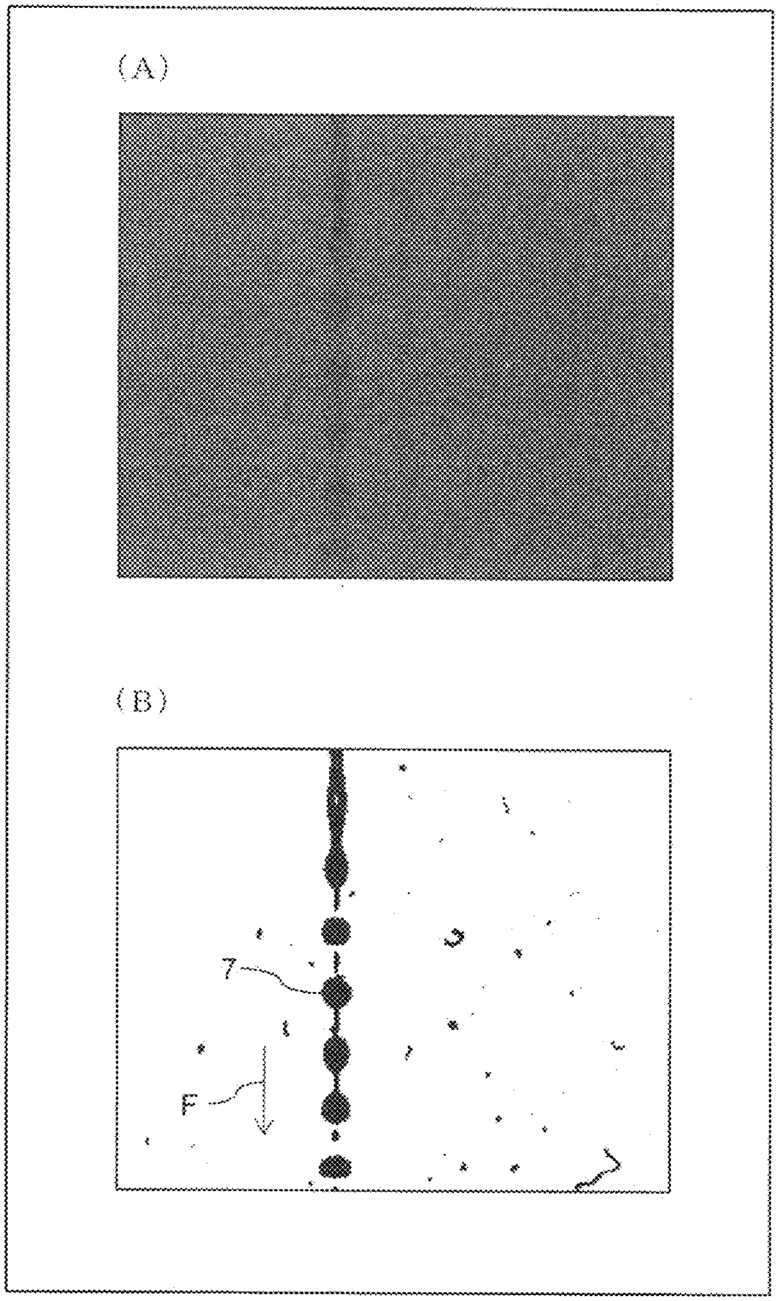
FIG. 4 is a high speed captured image diagram A and an analysis image diagram B of a flying trajectory of liquid droplets in a case where the ratio D/d is 97 in the first embodiment.

FIG. 4 illustrates the results of observing the flying trajectory of the liquid droplets 7 formed from the continuous flow 5 jetted from the nozzle hole 1 using a liquid jetting nozzle 11 where a nozzle diameter d of the nozzle hole 1 is 0.031 mm and an opening diameter D of the liquid inlet 21 is 3.0 mm, and a ratio D/d is 97. Using this result, in the same manner as the actual measurement example 1, a degree of the straight advancing property of the liquid droplet 7 was confirmed. The supply pressure, that is the jetting pressure of the liquid 3 jetted from the nozzle hole 1, was set to 1.3 MPa that is the same value used in the actual measurement example 1. The liquid 3 was jetted from the nozzle hole 1 as a contracted flow.

FIG. 4A is a high speed captured image diagram obtained by capturing a flying trajectory of liquid droplets 7 using a high speed camera. FIG. 4B is a view of an analyzed image obtained by applying image processing to the captured image in FIG. 4A in the same manner as the actual measurement example 1.

A deviation amount of the center 15 of the liquid droplet 7 with respect to the center axis 17 of the nozzle hole 1, that is, a maximum value of the radius r is in a range of not more than 0.01 mm. Accordingly, it was confirmed that the straight advancing property of the liquid droplet 7 was preferable. Further, it was confirmed that the landing range of the liquid droplet 7 was narrow that is, less than 0.3 mm in diameter from the center axis 27. As a result of such an actual measurement example, it is safe to say that the liquid jetting nozzle 11 is effective in cleaning a part of a target object.

Actual Measurement Example 3

Figure 5:
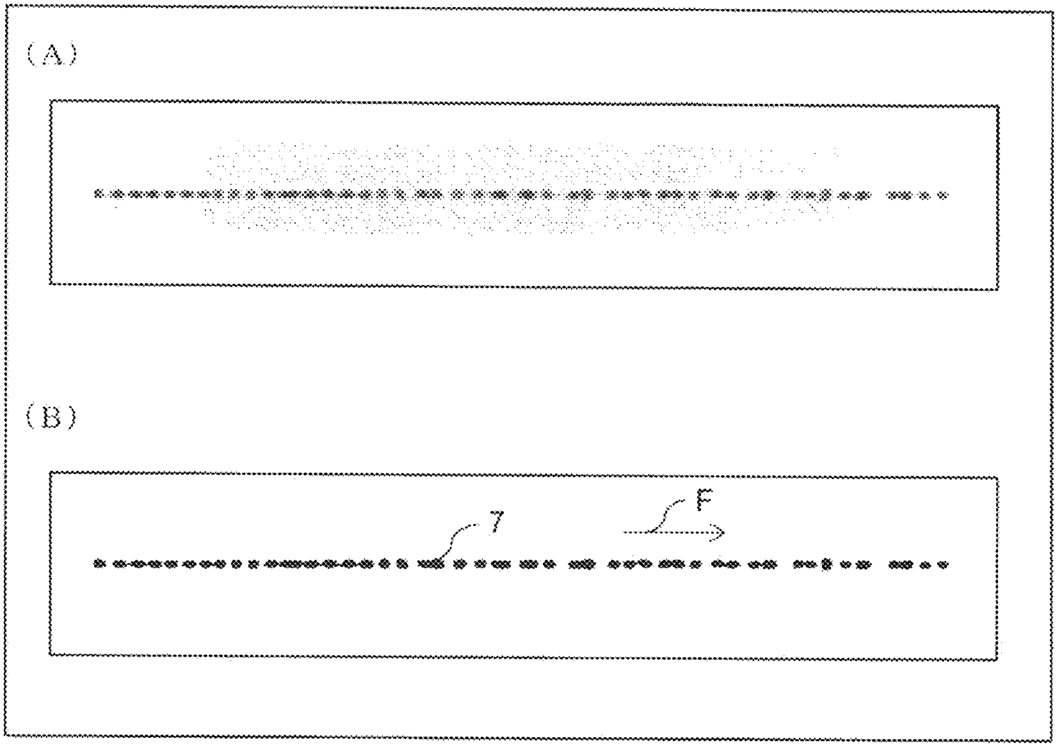
FIG. 5 is a high speed captured image diagram A and an analysis image diagram B of a flying trajectory of liquid droplets in a case where the ratio D/d is 13 in the first embodiment.

FIG. 5 illustrates the results of observing the flying trajectory of the liquid droplets 7 formed from the continuous flow 5 jetted from the nozzle hole 1 using a liquid jetting nozzle 11 where a nozzle diameter d of the nozzle hole 1 is 0.08 mm and an opening diameter D of the liquid inlet 21 is 1.0 mm, and a ratio D/d is 13. Using this result, in the same manner as the actual measurement example 1, a degree of the straight advancing property of the liquid droplet 7 was confirmed. The supply pressure, that is the jetting pressure of the liquid 3 jetted from the nozzle hole 1, was set to 6 MPa (approximately 100 m/s in jetting speed). The liquid 3 was jetted from the nozzle hole 1 as a contracted flow.

FIG. 5A is a high speed captured image diagram obtained by capturing a flying trajectory of liquid droplets 7 using a high speed camera. FIG. 5B is a view of an analyzed image obtained by applying image processing to the captured image in FIG. 5A in the same manner as the actual measurement example 1.

A deviation amount of the center 15 of the liquid droplet 7 with respect to the center axis 17 of the nozzle hole 1, that is, a maximum value of the radius r is in a range of not more than 0.05 mm. Accordingly, it was confirmed that the straight advancing property of the liquid droplet 7 was preferable. Further, it was confirmed that the landing range of the liquid droplet 7 was narrow that is, less than 0.3 mm in diameter from the center axis 27. As a result of such an actual measurement example, it is safe to say that the liquid jetting nozzle 11 is effective in cleaning a part of a target object.

Actual Measurement Example 4

Figure 6:
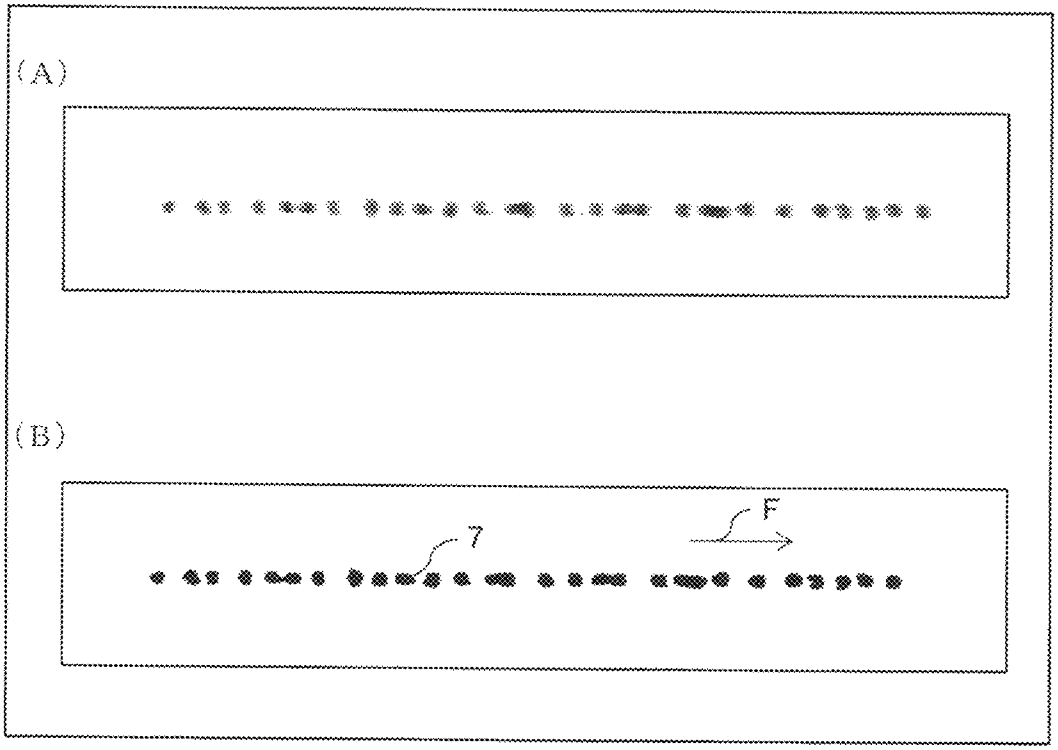
FIG. 6 is a high speed captured image diagram A and an analysis image diagram B of a flying trajectory of liquid droplets in a case where the ratio D/d is 8 in the first embodiment.

FIG. 6 illustrates the results of observing the flying trajectory of the liquid droplets 7 formed from the continuous flow 5 jetted from the nozzle hole 1 using a liquid jetting nozzle 11 where a nozzle diameter d of the nozzle hole 1 is 0.12 mm and an opening diameter D of the liquid inlet 21 is 1.0 mm, and a ratio D/d is 8. Using this result, in the same manner as the actual measurement example 1, a degree of the straight advancing property of the liquid droplet 7 was confirmed. The supply pressure, that is the jetting pressure of the liquid 3 jetted from the nozzle hole 1, was set to 6 MPa (approximately 100 m/s in jetting speed) that is the same value used in the actual measurement example 3. The liquid 3 was jetted from the nozzle hole 1 as a contracted flow.

FIG. 6A is a high speed captured image diagram obtained by capturing a flying trajectory of liquid droplets 7 using a high speed camera. FIG. 6B is a view of an analyzed image obtained by applying image processing to the captured image in FIG. 6A in the same manner as the actual measurement example 1.

A deviation amount of the center 15 of the liquid droplet 7 with respect to the center axis 17 of the nozzle hole 1, that is, a maximum value of the radius r is in a range of not more than 0.1 mm. Accordingly, it was confirmed that the straight advancing property of the liquid droplet 7 was preferable. Further, it was confirmed that the landing range of the liquid droplet 7 was narrow that is, less than 0.4 mm in diameter from the center axis 27. As a result of such an actual measurement example, it is safe to say that the liquid jetting nozzle 11 is effective in cleaning a part of a target object.

Further, the larger the nozzle hole diameter d, the larger the size of the liquid droplet 7 becomes. Accordingly, the liquid droplet 7 having high energy can be landed on the target object 9 with high accuracy. That is, the high-speed (efficient) cleaning of a part of a target object can be effectively performed.

As results of the actual measurement example 1 to the actual measurement example 4, it was confirmed that the liquid droplet straight advancing maintaining structures 19 of the liquid jetting nozzles 11 having the nozzle hole diameters d that fall within a range of from 0.024 mm to 0.12 mm, and ratios D/d that fall within a range of from 8 to 125 can cause the flying trajectory of the center 15 of the liquid droplet 7 to be within a radius of 0.5 mm from the center axis 17 of the nozzle hole 1.

With respect to the liquid droplet straight advancing maintaining structures 19 of the liquid jetting nozzles 11 having the nozzle hole diameters d of 0.01 mm and 0.15 mm that fall outside the above-mentioned range and ratios D/d of 5, 7 and 150 that fall outside the above-mentioned range, the flying trajectory of the center 15 of the liquid droplet 7 was confirmed by observing in the same manner as the actual measurement example 1 to the actual measurement example 4. As a result, also with respect to the liquid droplet straight advancing maintaining structures 19 of the liquid jetting nozzles 11, it was confirmed that the flying trajectory of the center 15 of the liquid droplet 7 can be within a radius of 0.5 mm from the center axis 17 of the nozzle hole 1.

Further, as results of the actual measurement example 1 to the actual measurement example 4, with respect to the liquid droplet straight advancing maintaining structures 19 of the liquid jetting nozzles 11 where the jetting pressures of the liquid jetted from the nozzle holes are 1.3 MPa and 6 MPA, it was confirmed that the flying trajectory of the center 15 of the liquid droplet 7 can be within a radius r of 0.5 mm from the center axis 17 of the nozzle hole 1.

Further with respect to the liquid droplet straight advancing maintaining structures 19 of the liquid jetting nozzles 11 where the jetting pressures of the liquid jetted from the nozzle holes are 0.2 MPa and 10 MPa, the flying trajectory of the center 15 of the liquid droplet 7 was confirmed in the same manner as the actual measurement example 1 to the actual measurement example 4. As a result, also with respect to the liquid droplet straight advancing maintaining structures 19 of the liquid jetting nozzles 11, it was confirmed that the flying trajectory of the center 15 of the liquid droplet 7 can be within a radius of 0.5 mm from the center axis 17 of the nozzle hole 1.

Further, in the present embodiment, a ratio L/d of the length L of the straight portion 23 of the nozzle hole 1 of the liquid jetting nozzle 11 in the liquid jet direction F to the nozzle hole diameter d of the nozzle hole 1 of the liquid jetting nozzle 11 is set to fall within a range of from 0.5 to 5.

In the actual measurement example 1, the straight part L was 0.02 mm, and the ratio L/d was 0.8.

In the actual measurement example 2, the straight part L was 0.02 mm, and the ratio L/d was 0.6.

In the actual measurement example 3, the straight part L was 0.2 mm, and the ratio L/d was 2.5.

In the actual measurement example 4, the straight part L was 0.75 mm, and the ratio L/d was 5.

With respect to the nozzle hole 1 where the ratio L/d falls outside the range of 0.5 to 5, by the observation adopted in the actual measurement example 1 to the actual measurement example 4, it was confirmed that a tendency that when the ratio L/d becomes smaller than 0.5, the above-mentioned straight advancing property is gradually lowered is increased. On the other hand, when the ratio L/d is 6 or greater, the liquid jetting nozzle 11 cannot be easily manufactured and the flow resistance is increased. The upper limit of the ratio L/d is set to 5 in consideration of these factors.

Description on Manner of Operation of First Embodiment

Next, the description is made with respect to a case where the liquid 3 is jetted toward the target object 9 by the liquid jetting nozzle 11 of the liquid jetting device 25 of the first embodiment.

A user directs the nozzle hole 1 of the jetting unit 2 toward the target object 9 and holds the nozzle hole 1 at the position. A distance between the end surface of the nozzle hole on the discharge side and the target object is in a range of from 100 mm to 150 mm. Then, a control signal is transmitted to the pump unit 27 via the control unit 4 so as to drive the pump unit 27. As a result, the liquid 3 in the liquid tank 6 is supplied to the liquid jetting nozzle 11 in a pressurized state through the flow path 10. As a result, the liquid 3 in the liquid jetting nozzle 11 is jetted from the nozzle hole 1 toward the target object 9 disposed at the above-mentioned distance from the nozzle hole 1 as the jet fluid.

With respect to the jet fluid, an initial continuous flow 5 is split by a surface tension thus forming a row of liquid droplets 7. Then, the row of liquid droplets 7 advances with high straight advancing property, and the liquid droplets 7 are caused to impinge on the target object 9 one after another thus performing the predetermined processing.

Description on Advantageous Effects of First Embodiment (1) According to the present embodiment, in the liquid jetting nozzle 11 that includes the nozzle hole 1 and is configured to hit the liquid droplets 7 against a target object, the liquid droplets being generated from the continuous flow 5 of the liquid 3 jetted from the nozzle hole 1 into the liquid droplets to the target object 9, the nozzle hole diameter d of the nozzle hole 1 is in a range of from 0.01 mm to 0.15 mm, and the ratio D/d of the opening diameter D of the liquid inlet 21 that forms the inlet through which the liquid 3 flow into the nozzle hole 1 to the nozzle hole diameter d is in a range of from 5 to 150. With such a configuration, the liquid jetting nozzle 11 can cause the liquid droplets 7 to fly with high straight advancing property. Further, it is possible to cause the liquid droplets 7 to fly over a long distance of 100 mm to 150 mm from the end surface 13 of the nozzle hole 1 on a discharge side with high straight advancing property.

(2) According to the present embodiment, the ratio L/d of the length L of the straight portion 23 of the nozzle hole 1 in the liquid jetting direction F to the nozzle hole diameter d is in a range of from 0.5 to 5. With such a configuration, it is possible to cause the liquid droplets 7 to fly over the long distance with higher straight advancing property.

(3) Further, according to the present embodiment, the pressurized liquid supply unit 27 supplies the liquid at a supply pressure such that the jetting pressure of the liquid jetted from the nozzle hole 1 is in a range of from 0.2 MPa to 10 MPa. With such a configuration, the liquid jetting nozzle 11 can cause the liquid droplets 7 to fly over the long distance with higher straight advancing property.

Second Embodiment

Figure 7:
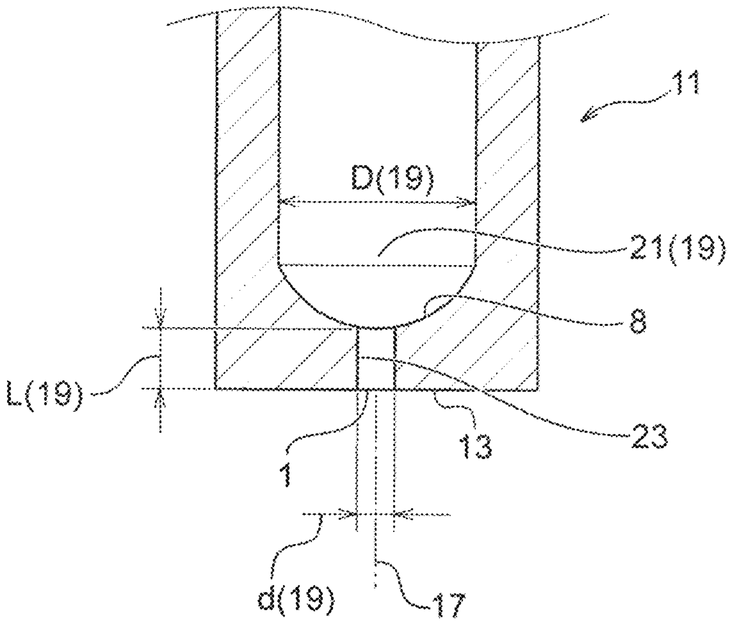
FIG. 7 is an enlarged cross-sectional view of a main portion of a liquid jetting nozzle of a second embodiment.

Next, a liquid jetting nozzle 1 according to a second embodiment of the present disclosure is described with reference to FIG. 7.

In the liquid jetting nozzle 1 of the present embodiment, a concave curved tapered portion 8 is formed between a liquid inlet 21 and an inlet of the nozzle hole 1. Further, a jetting port side of the nozzle hole 1 is formed in a flat shape, and no portion which corresponds to the tapered portion 16 of the first embodiment is formed.

Other configurations are substantially equal to the corresponding configurations of the first embodiment and hence, identical parts are given the same symbols, and their repeated description is omitted. The manner of operation and the advantageous effects of the present embodiment are substantially equal to the manner of operation and the advantageous effects of the first embodiment and hence, description of the manner of operation and the advantageous effects of the present embodiment is omitted.

Third Embodiment

Further, a liquid jetting nozzle 11 includes a nozzle hole 1, and the liquid jetting nozzle 11 is configured to hit liquid droplets 7 against a target object, the liquid droplets being generated from a continuous flow 5 of a liquid 3 jetted from the nozzle hole 1 9. The liquid jetting nozzle 11 may be configured such that a flying trajectory of a center 15 of the liquid droplet 7 is within a radius of 0.5 mm from a center axis 17 of the nozzle hole 1, along a predetermined distance from an end surface 13 of the nozzle hole 1 on a discharge side.

According to the present embodiment, by causing the liquid droplets 7 to fly linearly while suppressing a deviation of the liquid droplets 7, it is possible to cause the liquid droplets 7 to repeatedly impinge on the same portion of a target object 9. Accordingly, cleaning of a part of the target object can be realized.

Other Embodiments

The liquid jetting nozzles 1 and the liquid jetting devices 25 according to the embodiments of the present disclosure adopt the above-mentioned configurations as the basic configuration. However, as a matter of course, modifications, omission, and the like may be made to a partial configuration without departing from the gist of the disclosure of the present application.

In the embodiments described above, the description is made with respect to the case where the liquid 3 is jetted from the nozzle hole 1 as a contracted flow. The jetting in a contracted flow state is not a requisite condition in the present disclosure and hence, the present disclosure is applicable to a non-contracted flow where the jetted liquid 3 is brought into contact with a hole wall surface (straight portion 23) of the nozzle hole 1.

What is claimed is:

1. A liquid jetting nozzle comprising:
- a nozzle hole that includes a straight portion, wherein the liquid jetting nozzle is configured to hit liquid droplets against a target object,
- the liquid droplets are generated from a continuous linear flow of a liquid jetted from the nozzle hole,
- a nozzle hole diameter d of the nozzle hole is in a range of from 0.01 mm to 0.15 mm, and
- a ratio D/d is in a range of from 5 to 150, where D is an opening diameter of a liquid inlet that forms an inlet through which the liquid flows into the nozzle hole; and
- a tapered portion that expands in a diameter from an end of the straight portion of the nozzle hole towards a liquid jetting direction, wherein
- a length of the tapered portion along the liquid jetting direction is greater than a length of the straight portion along the liquid jetting direction.

2. The liquid jetting nozzle according to claim 1, wherein
- a ratio L/d is in a range of from 0.5 to 5, where L is a length of the straight portion in the liquid jetting direction of the nozzle hole.

3. A liquid jetting device comprising:
- the liquid jetting nozzle according to claim 2; and
- a pressurized liquid supply unit configured to pressurize the liquid and supply the liquid to the liquid jetting nozzle.

4. The liquid jetting device according to claim 3, wherein
- the pressurized liquid supply unit is configured to supply the liquid at a supply pressure at which a jetting pressure of the liquid jetted from the nozzle hole is in a range of from 0.2 MPa to 10 MPa.

5. A liquid jetting device comprising:
- the liquid jetting nozzle according to claim 1; and
- a pressurized liquid supply unit configured to pressurize the liquid and supply the liquid to the liquid jetting nozzle.

6. The liquid jetting device according to claim 5, wherein
- the pressurized liquid supply unit is configured to supply the liquid at a supply pressure at which a jetting pressure of the liquid jetted from the nozzle hole is in a range of from 0.2 MPa to 10 MPa.

7. The liquid jetting nozzle according to claim 1, wherein
- the length of the straight portion in the liquid jetting direction is smaller than a diameter of the tapered portion on an end surface of the nozzle hole.

8. The liquid jetting nozzle according to claim 7, wherein a distance between a center of the liquid droplets and a center axis of the nozzle hole is 0.5 mm or less, and the distance is along the liquid jetting direction for a predetermined distance in a range from 100 mm to 150 mm from the end surface of the nozzle hole on a discharge side.

9. A liquid jetting nozzle comprising:

a nozzle hole that includes a straight portion, wherein the liquid jetting nozzle is configured to hit liquid droplets against a target object, the liquid droplets are generated from a continuous linear flow of a liquid jetted from the nozzle hole, a distance between a center of a liquid droplet of the liquid droplets and a center axis of the nozzle hole is 0.5 mm or less, along a predetermined distance from an end surface of the nozzle hole on a discharge side; and a tapered portion that expands in a diameter from an end of the straight portion of the nozzle hole towards a liquid jetting direction, wherein a diameter of the tapered portion on the end surface of the nozzle hole is greater than a length of the straight portion in the liquid jetting direction.

10. A liquid jetting device comprising:

the liquid jetting nozzle according to claim 9; and a pressurized liquid supply unit configured to pressurize the liquid and supply the liquid to the liquid jetting nozzle.

11. The liquid jetting device according to claim 10, wherein the pressurized liquid supply unit is configured to supply the liquid at a supply pressure at which a jetting pressure of the liquid jetted from the nozzle hole is in a range of from 0.2 MPa to 10 MPa.

* * * * *